(No Model.)

T. V. PLICE.
SULKY PLOW.

No. 253,761. Patented Feb. 14, 1882.

Attest:
H. H. Schott
A. R. Brown

Inventor:
Thomas Vinton Plice
C. H. Watson

UNITED STATES PATENT OFFICE.

THOMAS V. PLICE, OF POLK, OHIO.

SULKY-PLOW.

SPECIFICATION forming part of Letters Patent No. 253,761, dated February 14, 1882.

Application filed November 3, 1881. (No model.)

*To all whom it may concern:*

Be it known that I, THOMAS V. PLICE, a citizen of the United States, residing at Polk, in the county of Ashland and State of Ohio, have invented certain new and useful Improvements in Wheel-Cultivators, of which the following is a specification, reference being had therein to the accompanying drawings.

This invention relates to improvements in wheel-cultivators; and it consists in a novel arrangement of shovel-plows, shields, and a scraper, the object being to provide a simple, light, and effective cultivator for working corn or other crops grown in rows, as will be hereinafter more fully described.

Figure 1:
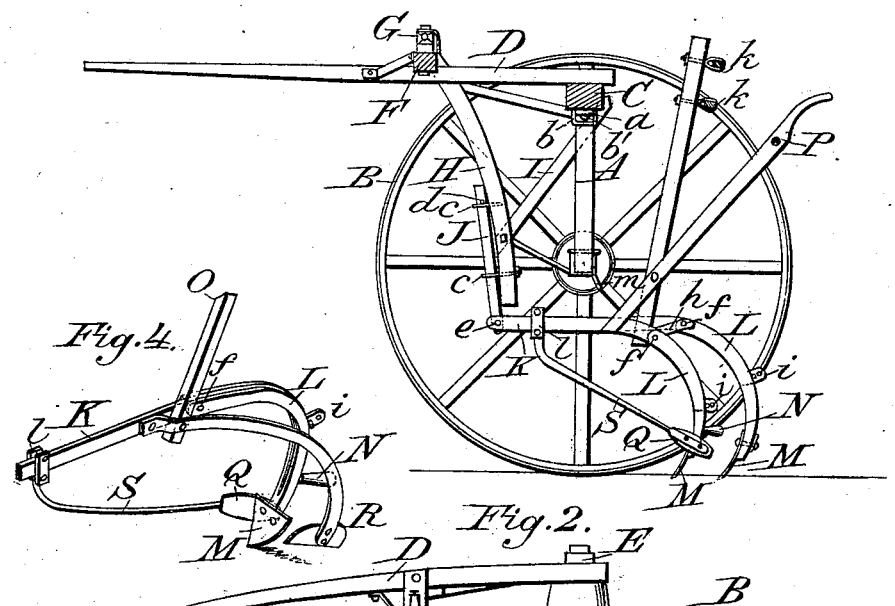
Figure 2:
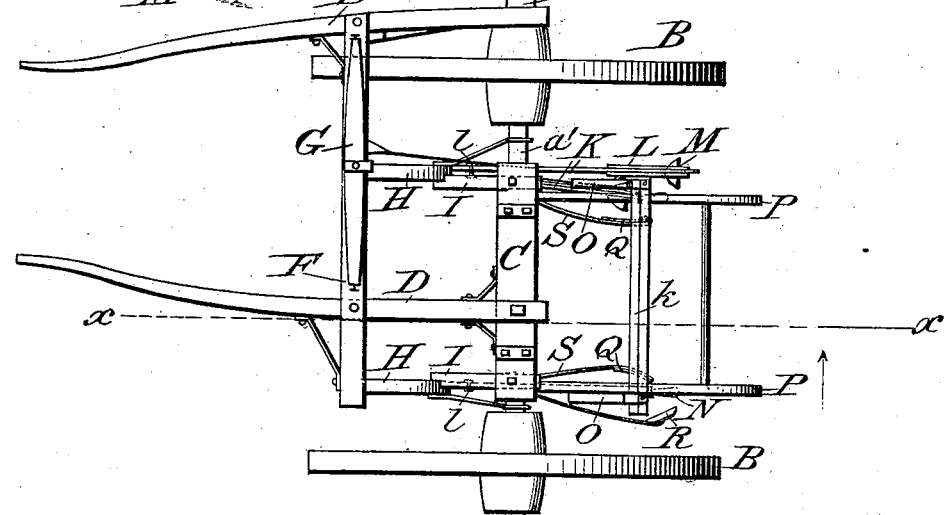
Figure 3:
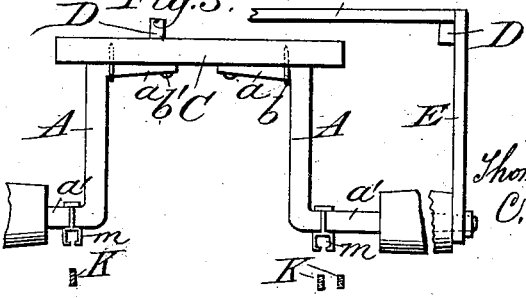

In the annexed drawings, Figure 1 is a vertical section, on line $x$ $x$ of Fig. 2, of my improved cultivator. Fig. 2 is a plan view of same; Fig. 3, a partial end view; and Fig. 4 is a perspective view of a shovel, the scraper, and shield in their relative positions.

A A represent two bent axles, each having two horizontal arms or bends, $a$ $a$ and $a'$ $a'$. The arms $a'$ $a'$ have attached to them the driving-wheels B B. The arms $a$ $a$ are fastened to a cross piece or bar, C, by means of the loops $b$ and bolts $b'$, as shown in Fig. 3. To this bar C is bolted one of the shafts D. The other shaft D is bolted to an upright arm, E, on one of the axles $a'$, outside of the hub of the wheel B, as shown in Fig. 3.

F is another cross-bar, uniting the shafts D D and carrying upon it the single-tree G. To this cross-bar F are bolted two pendants or curved pieces, H H, which are connected by the braces I I with the cross-bar C. The shafts D D are suitably braced to the cross-bars, as shown.

To the lower ends of pendants H H, which are connected by braces to the arms $a'$ $a'$, are attached, by means of the eyebolts $c$ $c$, the rods J J. Pins $d$ $d$ pass through these rods above the eyebolts, and keep the same in position on the pendants.

To the lower ends of the rods J J are pivoted at $e$ $e$ the beams K K, which are single on one side of the machine and double or forked on the other. The forked beam has a suitable brace, $h$.

L L are the shovel or plow beams, pivoted at $f$ $f$ to the beams K K, and carrying at their lower ends the shovels or plows M M, of ordinary form.

N N are handles secured to the beams L L above the shovels, and are for raising the plows from the ground when desired.

At the rear ends of the beams K K are the lugs $i$ $i$, having two or more holes for reception of holding-pins, whereby a slight adjustment of the plows on the beams K K is obtained.

O O are standards secured at their lower ends to the beams K K, and having at their upper ends the cross bars or braces $k$ $k$, which serve also as handles for raising the beams when the machine is used as a riding-cultivator, a seat for the driver being provided and attached to the cross-bar C.

The usual plow-handles, P P, are secured to the standards O O and beams K K, as shown.

Q Q are shields or fenders, slightly concave in shape, and placed a small distance to one side of the shovels, so that the corn or other growing plants may be plowed as close as desired without injuring or covering up the plants, and protecting them from clods, rocks, &c. These shields are riveted or otherwise secured to rods S S, which are secured to the forward ends of the beams K K by means of the clips $l$ $l$.

R is a scraper or share, connected by means of a bar with the beam K, to which it is bolted, as shown, and serves the usual purpose.

Loops $m$ $m$ are bolted or clipped on the arms $a'$ $a'$. These are rectangular in shape, having an opening for the passage of the beams when the plows are raised from the ground, and hold said beams therein.

In plowing, when the end of the row is reached, and before turning the machine, the plows are raised by means of the handles N N when the cultivator is used as a walking, or by the bars or handles $k$ $k$ when used as a riding-cultivator. All the parts being light, this is easily done, and the plants are thus prevented from being broken down or injured by the shovels on turning the machine to begin a new row.

Having thus described my invention, what I claim as new, and desire to secure by Letters Patent, is—

The combination, in a sulky-cultivator, with the swiveled rods J J, of the pivoted beams K K, shovel-beams L L, pivoted thereto, and provided with handles N N and shovels M M, and the scraper R, connected with one of said beams by a curved bar, substantially as shown and described.

In testimony whereof I affix my signature in presence of two witnesses.

THOMAS VINTON PLICE.

Witnesses:
W. H. AMBROSE,
SAMUEL PLICE.